(12) United States Patent
Drake et al.

(10) Patent No.: US 6,395,949 B1
(45) Date of Patent: May 28, 2002

(54) ACID TREATED ZEOLITE CONTAINING PHOSPHORUS USED AS A CATALYST IN PROCESSES FOR CONVERTING HYDROCARBONS, AND USE OF BINARY HYDROCARBON MIXTURES AS DILUENTS IN PROCESSES FOR CONVERTING HYDROCARBONS

(75) Inventors: Charles A. Drake, Nowata; Jianhua Yao, Bartlesville, both of OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/627,103

(22) Filed: Jul. 27, 2000

Related U.S. Application Data

(62) Division of application No. 09/128,337, filed on Aug. 3, 1998, now abandoned.

(51) Int. Cl.$^7$ ................................................. C07C 4/02
(52) U.S. Cl. ....................................... 585/651; 585/653
(58) Field of Search .............................. 502/64, 71, 77, 502/81, 83, 85, 208, 214; 208/110, 114; 585/651, 653

(56) References Cited

U.S. PATENT DOCUMENTS

| | | | |
|---|---|---|---|
| 3,944,481 A | * 3/1976 | Wing et al. ............... 208/61 |
| 3,972,832 A | 8/1976 | Butter et al. .............. 252/437 |
| 4,356,338 A | 10/1982 | Young ....................... 585/407 |
| 4,409,132 A | 10/1983 | Forbus et al. .............. 502/62 |
| 4,456,780 A | 6/1984 | Young ....................... 585/475 |
| 4,565,897 A | 1/1986 | Gane et al. ................ 585/415 |
| 4,665,251 A | 5/1987 | Chu ........................... 585/415 |
| 4,754,100 A | 6/1988 | Sorensen et al. .......... 585/708 |
| 4,804,801 A | 2/1989 | Yan ........................... 585/407 |
| 4,935,566 A | 6/1990 | Dessau et al. ............. 208/65 |
| 5,013,423 A | 5/1991 | Chen et al. ................ 208/64 |
| 5,037,529 A | 8/1991 | Dessau et al. ............. 208/64 |
| 5,059,735 A | 10/1991 | Nemmet-Mavrodin ...... 585/418 |
| 5,118,482 A | 6/1992 | Narayana et al. .......... 423/328 |
| 5,164,350 A | 11/1992 | Abe et al. .................. 502/66 |
| 5,171,921 A | 12/1992 | Gaffney et al. ............ 585/653 |
| 5,191,131 A | * 3/1993 | Takahata et al. ........... 585/324 |
| 5,220,086 A | 6/1993 | Rodewald .................. 585/407 |
| 5,262,141 A | 11/1993 | Skeels ....................... 423/328 |
| 5,481,057 A | * 1/1996 | Bell et al. .................. 585/722 |
| 5,573,990 A | * 11/1996 | Wang et al. ............... 502/77 |
| 5,773,676 A | 6/1998 | Drake et al. ............... 585/322 |
| 5,776,852 A | 7/1998 | Wu et al. .................. 502/177 |
| 5,804,059 A | 9/1998 | Wu et al. .................. 208/135 |
| 5,827,422 A | 10/1998 | Drake et al. ............... 208/135 |
| 5,866,741 A | 2/1999 | Wu et al. .................. 585/475 |
| 5,866,742 A | 2/1999 | Wu et al. .................. 585/475 |
| 5,866,744 A | 2/1999 | Wu et al. .................. 585/486 |
| 5,883,033 A | 3/1999 | Drake et al. ............... 502/68 |
| 5,883,034 A | 3/1999 | Drake et al. ............... 502/68 |
| 5,895,828 A | * 4/1999 | Yao et al. .................. 585/418 |
| 5,981,418 A | 11/1999 | Drake et al. ............... 502/64 |
| 6,004,896 A | 12/1999 | Addiego .................... 502/64 |
| 6,025,293 A | * 2/2000 | Wu et al. .................. 502/60 |
| 6,054,113 A | 4/2000 | Vaughan et al. ........... 423/713 |
| 6,124,515 A | * 9/2000 | Wu et al. .................. 585/418 |

OTHER PUBLICATIONS

Application No. 09/022,628 filed on Feb. 12, 1998.
Application No. 09/078,030 filed on May 13, 1998, U.S. Pat. 6,203,694; issued Mar. 20, 2001.

* cited by examiner

Primary Examiner—Steven P. Griffin
Assistant Examiner—Cam N. Nguyen
(74) Attorney, Agent, or Firm—Charles W. Stewart

(57) ABSTRACT

A method of increasing total diluent conversion in a process for the conversion of cracked gasoline and a first diluent comprising iso-pentane to aromatics and light olefins by contacting the cracked gasoline, the first diluent and a second diluent comprising either propane or 1-hexene with a zeolite catalyst containing phosphorus. The zeolite catalyst comprises a calcined, acid-leached zeolite and phosphorus. Also described is a method of making such catalyst.

38 Claims, No Drawings

ACID TREATED ZEOLITE CONTAINING PHOSPHORUS USED AS A CATALYST IN PROCESSES FOR CONVERTING HYDROCARBONS, AND USE OF BINARY HYDROCARBON MIXTURES AS DILUENTS IN PROCESSES FOR CONVERTING HYDROCARBONS

This application is a division of application Ser. No. 09/128,337, filed Aug. 3, 1998.

BACKGROUND OF THE INVENTION

The present invention relates to the field of hydrocarbon upgrading processes. In another aspect, the invention relates to the conversion of cracked gasoline and a lower-alkane diluent in the presence of an improved zeolite material and/or a second diluent to aromatics and ethylene and propylene preferably with an increased conversion of the lower-alkane diluent in the presence of such improved zeolite material and/or the second diluent.

It is known to those skilled in the art that aromatic hydrocarbons and olefins are each a class of very important industrial chemicals which find a variety of uses in petrochemical industry. It can be desirable to co-feed a lower-alkane diluent with gasoline-range hydrocarbons to a process which uses a zeolite conversion catalyst to enhance the conversion of the gasoline-range hydrocarbons. One problem with the co-feeding of lower-alkane diluents is the generally low conversion of the diluent. It is desirable to improve processes for converting gasoline-range hydrocarbons and lower-alkane diluents to aromatics and lower olefins by increasing the conversion of the gasoline-range hydrocarbons and the co-fed lower-alkane diluent.

SUMMARY OF THE INVENTION

It is an object of this invention to at least partially convert hydrocarbons, in particular, a hydrocarbon feed mixture comprising cracked gasoline and a lower-alkane diluent, to ethylene, propylene and BTX aromatics.

A further object of this invention is to provide an aromatization process for the conversion of at least a portion of a hydrocarbon feed mixture comprising cracked gasoline and a lower-alkane diluent to aromatics and lower olefins in which the conversion of the lower-alkane diluent is enhanced by co-feeding a second hydrocarbon diluent.

A still further object of this invention is to provide an improved zeolite material that gives improved conversion of a lower-alkane diluent in a process for the conversion of a hydrocarbon feed mixture comprising cracked gasoline and a lower-alkane diluent to aromatics and lower olefins.

Another further object of this invention is to provide a method for making an improved zeolite material having such desirable properties as providing for increased conversion of a lower-alkane diluent in a process for the conversion of a hydrocarbon feed mixture comprising cracked gasoline and a lower-alkane diluent to aromatics and lower olefins.

The invention includes a novel catalyst composition for use in converting hydrocarbons. This novel catalyst composition comprises phosphorus and a calcined, acid-leached zeolite and is prepared by incorporating phosphorus into a calcined, acid-leached zeolite material.

One of the inventive processes provides for the conversion of hydrocarbons to aromatics and lower olefins by contacting under conversion conditions a hydrocarbon feed mixture comprising cracked gasoline and a lower-alkane diluent with a catalyst composition comprising phosphorus and a calcined, acid-leached zeolite.

Another of the inventive processes provides for the conversion of hydrocarbons to aromatics and lower olefins by:

a) introducing a hydrocarbon feed mixture comprising cracked gasoline and a first diluent comprising isopentane to a reaction zone, the reaction zone contains a catalyst comprising a zeolite and a phosphorus component and is operated under reaction conditions for converting hydrocarbons to light olefins;

b) withdrawing from the reaction zone a reactor effluent comprising light olefins; and c) controllably introducing a second diluent comprising propane into the reaction zone in an amount such that the mole ratio of the second diluent to the first diluent is in the range of from about 1:0.1 to about 1:10, whereby the percent conversion of the first diluent is enhanced over the percent conversion of the first diluent when there is no step c.

Yet another of the inventive processes provides for the conversion of hydrocarbons to aromatics and lower olefins by:

a) introducing a hydrocarbon feed mixture comprising cracked gasoline and a first diluent comprising isopentane to a reaction zone, the reaction zone contains a catalyst comprising a zeolite and a phosphorus component and is operated under reaction conditions for converting hydrocarbons to light olefins;

b) withdrawing from the reaction zone a reactor effluent comprising light olefins; and c) controllably introducing a second diluent comprising 1-hexene into the reaction zone in an amount such that the mole ratio of the second diluent to the first diluent is in the range of from about 1:0.1 to about 1:10, whereby the percent conversion of the first diluent is enhanced over the percent conversion of the first diluent when there is no step c.

Other objects and advantages of the invention will become apparent from the detailed description and the appended claims.

DETAILED DESCRIPTION OF THE INVENTION

The inventive composition includes a zeolite starting material that has been treated with an acid followed by calcining to thereby provide a calcined, acid-leached zeolite. The inventive composition further contains a phosphorus component.

An important aspect of the invention is for the starting zeolite material, which is being modified to provide the inventive composition having the desirable properties as earlier described herein, to be treated with an acid to give an acid leached zeolite. A further important aspect of the invention is for the acid-leached zeolite to be calcined to give a calcined, acid-leached zeolite. The calcined, acid-leached zeolite is further modified by the incorporation of a phosphorus component.

Any suitable means or method can be used to treat the zeolite starting material with acid. It is preferred for the zeolite to be soaked with an acid solution by any suitable means known in the art for contacting the zeolite with such acid solution. The acid solution used to treat the zeolite can be a solution of any acid that suitably provides for the leaching of aluminum atoms from the zeolite particles. Preferably, the acid concentration in this solution is about 1–10 equivalents per liter. Examples of such suitable acids include sulfuric, phosphoric, nitric and hydrochloric. The preferred acid solution is aqueous hydrochloric acid solution. The zeolite is soaked in the acid solution (preferably at a temperature of about 50–100° C.) for a period upwardly to about 15 hours, but, preferably from 0.1 hour to 12 hours. After soaking, the resultant acid-leached zeolite is washed free of the acid and then can be dried.

The zeolite starting material used in the composition of the invention can be any zeolite which is effective in the conversion of non-aromatic to aromatics when contacted under suitable reaction conditions with non-aromatic hydrocarbons. Preferably, the zeolite has a constraint index (as defined in U.S. Pat. No. 4,097,367, which is incorporated herein by reference) in the range of from about 0.4 to about 12, preferably from about 2 to about 9. Generally, the molar ratio of $SiO_2$ to $Al_2O_3$ in the crystalline framework of the zeolite is at least about 5:1 and can range up to infinity. Preferably the molar ratio of $SiO_2$ to $Al_2O_3$ in the zeolite framework is about 8:1 to about 200:1, more preferably about 12:1 to about 100:1. Preferred zeolites include ZSM-5, ZSM-8, ZSM-11, ZSM-12, ZSM-35, ZSM-38, and mixtures thereof. Some of these zeolites are also known as "MFI" or "Pentasil" zeolites. The presently more preferred zeolite is ZSM-5.

Any suitable means or method can be used to calcine the acid-leached zeolite. The means or method to calcine generally can include heating the acid-leached zeolite to a temperature in the range of from about 250° C. to about 1,000° C., preferably about 350° C. to about 750° C., and most preferably from 400° C. to 650° C. at a pressure in the range of from below atmospheric upwardly to about 1000 psia (pounds per square inch absolute), preferably from about atmospheric to about 100 psia, and for a time period in the range of from about 0.1 hour to about 30 hours, preferably from about 0.5 hour to about 20 hours, and most preferably from 1 hour to 15 hours.

The inventive composition further includes, in addition to the calcined, acid-leached zeolite, a phosphorus component. The phosphorus component can be incorporated into the calcined, acid-leached zeolite by any suitable means or method known in the art for incorporating a phosphorus component into a substrate material. A preferred method is the use of any standard incipient wetness technique for impregnating the calcined, acid-leached zeolite substrate with a phosphorus component. The preferred method uses a liquid impregnation solution containing the desirable concentration of a phosphorus component so as to ultimately provide the final inventive composition having the required concentration of phosphorus.

The preferred impregnation solution is a solution formed by dissolving a phosphorus compound in a hydrocarbon solvent. The preferred hydrocarbon solvent is hexane. Generally, any phosphorus compounds which can be converted into a phosphorus oxide can be used. Examples of suitable phosphorus compounds include, but are not limited to, phosphorus pentoxide, phosphorus oxychloride, phosphoric acid, organic phosphates, $P(OR)_3$, $P(O)(OR)_3$, $P(O)(R)(R)(R)$, $P(R)(R)(R)$, and combinations of two or more thereof wherein each R can be the same or different and is independently selected from the group consisting of alkyl radicals, alkenyl radicals, aryl radicals, alkaryl radicals, aralkyl radicals, and combinations of any two or more thereof. Examples of suitable organic phosphates include, but are not limited to, trimethylphosphate, triethylphosphate, tripropylphosphate, and combinations of two or more thereof. The presently preferred organic phosphates are trimethylphosphate and triethyl phosphate for they are readily available.

The amount of phosphorus incorporated or impregnated into the calcined, acid-leached zeolite should be such as to give concentrations effective in providing the desirable properties of favorable aromatics and olefin conversion yields with high conversions of a lower-alkane diluent when the inventive composition is employed in the conversion of cracked gasoline and a lower-alkane diluent.

The weight percent of phosphorus present in the impregnated calcined, acid-leached zeolite is generally in the range upwardly to about 10 weight percent of the impregnated calcined, acid-leached zeolite. The preferred concentration of phosphorus in the impregnated calcined, acid-leached zeolite is in the range of from about 1 to about 8 weight percent and, most preferably, from 3 to 6 weight percent.

It is believed that the unique properties of the inventive composition described herein result from the addition of the phosphorus component to the acid-leached zeolite after calcining the acid-leached zeolite. The combination of preparation steps and specific order of such steps gives a composition that provides for an increased conversion of a lower-alkane diluent, comprising a hydrocarbon selected from the group consisting of propane, butane, pentane, and isopentane, in a process for the conversion of a hydrocarbon feed mixture, comprising cracked gasoline and a lower-alkane diluent. The preferred lower-alkane diluent is a hydrocarbon selected from the group consisting of propane and iso-pentane.

The inventive composition described herein can also contain an inorganic binder (also called matrix material) preferably selected from the group consisting of alumina, silica, alumina-silica, aluminum phosphate, clays (such as bentonite), and mixtures thereof. The content of the impregnated calcined, acid-leached zeolite component of the mixture of impregnated calcined, acid-leached zeolite and inorganic binder is in the range of from about 1 to about 99 weight %, preferably from about 5 to about 80 weight %, and most preferably from 10 to 70 weight %, and the content of the above-listed inorganic binders in the mixture of impregnated calcined, acid-leached zeolite and inorganic binder is in the range of from about 1 to about 50 weight %. Generally, the impregnated calcined, acid-leached zeolite and inorganic binder components are compounded and subsequently shaped (such as by pelletizing, extruding or tableting). Generally, the surface area of the compounded composition is about 50 to about 700 $m^2/g$, and its particle size is about 1 to about 10 mm.

Any suitable hydrocarbon feed mixture comprising a cracked gasoline and a lower-alkane diluent, as described above, can be used as the feed to be contacted with the inventive composition under suitable process conditions for obtaining a reaction product comprising lower alkenes containing 2–5 carbon atoms per molecule and aromatic hydrocarbons.

Non-limiting examples of suitable cracked gasoline include gasolines from catalytic oil cracking (e.g., FCC and hydrocracking) processes, pyrolysis gasolines from thermal hydrocarbon (e.g., ethane, propane, and naphtha) cracking processes, naphthas, gas oils, reformates, straight-run gasoline and the like. The preferred cracked gasoline is a gasoline-boiling range cracked gasoline suitable for use as at least a gasoline blend stock generally having a boiling range of from about 30 to about 210° C. Generally, the content of paraffins exceeds the combined content of olefins, naphthenes and aromatics (if present).

The hydrocarbon feed mixture can be contacted by any suitable manner with the inventive composition described herein contained within a reaction zone. The contacting step can be operated as a batch process step or, preferably, as a continuous process step. In the latter operation, a solid catalyst bed or a moving catalyst bed or a fluidized catalyst bed can be employed. Any of these operational modes have advantages and disadvantages, and those skilled in the art can select the one most suitable for a particular feed and catalyst.

The contacting step is preferably carried out within a conversion reaction zone, wherein is contained the inventive composition, and under reaction conditions that suitably promote the formation of olefins, preferably light olefins, and aromatics, preferably BTX, from at least a portion of the hydrocarbons of the hydrocarbon feed mixture. The reaction temperature of the contacting step is more particularly in the range of from about 400° C. to about 800° C., preferably from about 450° C. to about 750° C. and, most preferably, from 500° C. to 700° C. The contacting pressure can range from subatmospheric pressure upwardly to about 500 psia, preferably, from about atmospheric to about 450 psia and, most preferably, from 20 psia to 400 psia.

The mole ratio of the lower-alkane diluent to the cracked gasoline should be in the range of from about 1:0.1 to about 1:10, preferably from about 1:0.2 to about 1:8, and most preferably from 1:0.5 to 1:5.

The flow rate at which the hydrocarbon feed mixture is charged to the conversion reaction zone is such as to provide a weight hourly space velocity ("WHSV") in the range of from exceeding 0 hour$^{-1}$ upwardly to about 1000 hour$^{-1}$. The term "weight hourly space velocity", as used herein, shall mean the numerical ratio of the rate at which a hydrocarbon feed is charged to the conversion reaction zone in pounds per hour divided by the pounds of catalyst contained in the conversion reaction zone to which the hydrocarbon is charged. The preferred WHSV of the hydrocarbon feed mixture to the conversion reaction zone or contacting zone can be in the range of from about 0.25 hour$^{-1}$ to about 250 hour$^{-1}$ and, most preferably, from 0.5 hour$^{-1}$ to 100 hour$^{-1}$.

The percent conversion of the lower-alkane diluent in the process for converting the hydrocarbon feed mixture by contacting the hydrocarbon feed mixture with the inventive composition is significantly better than such percent conversion where the composition has not been calcined prior to incorporation of phosphorous therein. Typically, the percent conversion is up to 95% better, but, more typically, the improvement in conversion is in the range of from about 20% to about 90%.

In another embodiment of the invention, it has been discovered that the controlled introduction of a second diluent comprising propane to the reaction zone, along with a hydrocarbon feed mixture comprising cracked gasoline and a first diluent comprising isopentane, for contact with a catalyst comprising a zeolite and a phosphorus component (not necessarily, but preferably, the inventive catalyst described herein) results in increased conversion of the first diluent over the percent conversion of the first diluent in a process where the second diluent is not introduced to the reaction zone.

A percent conversion is identified representing the percent conversion of the first diluent to light olefins and aromatics when there is no introduction of the second diluent. The identified percent conversion of the first diluent when there is no introduction of the second diluent is more particularly in the range upwardly to about 38 weight %. The second diluent is then controllably introduced to the reaction zone resulting in a mole ratio of the second diluent to the first diluent.

The mole ratio of the second diluent to the first diluent can be any ratio that can enhance the percent conversion of the first diluent over the identified percent conversion when there is no introduction of the second diluent. The mole ratio of the second diluent to the first diluent is more particularly in the range of from; about 1:0.1 to about 1:10, preferably in the range of from about 1:0.2 to about 1:8, and most preferably from 1:0.5 to 1:5.

The second diluent can be controllably introduced to the reaction zone in any manner suitable for providing the mole ratio described above resulting in increased percent conversion of the first diluent. The percent conversion of the first diluent when there is a controlled introduction of the second diluent is more particularly in the range of from about 40 to about 90 weight %, preferably in the range of from about 41 to about 80 weight %, and most preferably from 42 to 60 weight %.

The reactor effluent resulting from the practice of this process will have a significant increase in petrochemical concentration (defined as ethylene, propylene, butylenes, benzene, toluene and xylenes) as compared to the petrochemical concentration of the reactor effluent when the second diluent is not introduced to the reaction zone. The reactor effluent may comprise a light olefin, such as, ethylene, propylene, or butylenes, and an aromatic, such as, benzene, toluene or xylenes. It is preferred for the reactor effluent to contain both light olefins and aromatics and, most preferably, the reactor effluent includes ethylene, propylene, butylene and BTX. The weight percent of petrochemicals in the reactor effluent is more particularly in the range of from about 54 to about 90, preferably in the range of from about 55 to about 80, and most preferably from 55 to 70.

The reaction zone is operated at a temperature in the range of from about 400° C. to about 800° C., preferably from about 450° C. to about 750° C., and most preferably from 500° C. to 700° C.; a pressure in the range of from subatmospheric pressure to about 500 psia, preferably from about atmospheric to about 450 psia, and most preferably from 20 psia to 400 psia; and a weight hourly space velocity for the combination of the cracked gasoline, first diluent and second diluent in the range of from exceeding 0 hour$^{-1}$ to about 1000 hour$^{-1}$, preferably from about 0.25 hour$^{-1}$ to about 250 hours$^{-1}$, and most preferably from 0.5 hour$^{-1}$ to 100 hour$^{-1}$.

The reaction can take place in any reactor system known to those skilled in the art to be suitable for use in converting hydrocarbons to light olefins and aromatics in the presence of a zeolite catalyst. Typical reactor systems useful in the present invention include, but are not limited to, a fixed bed system, a moving bed system, a fluidized bed system and batch type operations.

In a further aspect of this embodiment, the mole ratio of the cracked gasoline to the combination of the first diluent and the second diluent is maintained substantially constant while providing increased first diluent conversion without a substantial change in selectivity of light olefins and BTX formation. The mole ratio of the cracked gasoline to the combination of the first diluent and the second diluent is more particularly in the range of from about 1:1 to about 1:6, preferably in the range of from about 1:2 to about 1:5, and most preferably from 1:3 to 1:4. Maintaining the mole ratio of the cracked gasoline to the combination of the first diluent and the second diluent substantially constant enhances the production of aromatics and light olefins and increases total diluent conversion.

In yet another embodiment of the invention, it has been discovered that the controlled introduction of a second diluent comprising 1-hexene to the reaction zone, along with a hydrocarbon feed mixture comprising cracked gasoline and a first diluent comprising isopentane, for contact with a catalyst comprising a zeolite and a phosphorus component (not necessarily, but preferably, the inventive catalyst described herein) results in increased conversion of the first diluent over the percent conversion of the first diluent in a process where the second diluent is not introduced to the reaction zone.

A percent conversion is identified representing the percent conversion of the first diluent to light olefins and aromatics when there is no introduction of the second diluent. The identified percent conversion of the first diluent when there is no introduction of the second diluent is more particularly in the range upwardly to about 38 weight %. The second diluent is then controllably introduced to the reaction zone resulting in a mole ratio of the second diluent to the first diluent.

The mole ratio of the second diluent to the first diluent can be any ratio that can enhance the percent conversion of the first diluent over the identified percent conversion when there is no introduction of the second diluent. The mole ratio of the second diluent to the first diluent is more particularly in the range of from about 1:0.1 to about 1:10, preferably in the range of from about 1:0.2 to about 1:8, and most preferably from 1:0.5 to 1:5.

The second diluent can be controllably introduced to the reaction zone in any manner suitable for providing the mole ratio described above resulting in increased percent conversion of the first diluent. The percent conversion of the first diluent when there is a controlled introduction of the second diluent is more particularly in the range of from about 39 to about 90 weight %, preferably in the range of from about 40 to about 80 weight %, and most preferably from 41 to 60 weight %.

The reactor effluent resulting from the practice of this process will have an increase in petrochemical (defined as ethylene, propylene, butylenes, benzene, toluene and xylenes) concentration as compared to the petrochemical concentration of the reactor effluent when the second diluent is not introduced to the reaction zone. The reactor effluent may comprise a light olefin, such as, ethylene, propylene, or butylenes, and an aromatic, such as, benzene, toluene or xylenes. It is preferred for the reactor effluent to contain both light olefins and aromatics and, most preferably, the reactor effluent includes ethylene, propylene, butylene and BTX. The weight percent of petrochemicals in the reactor effluent is more particularly in the range of from about 50 to about 90, preferably in the range of from about 51 to about 80, and most preferably from52 to 70.

The reaction zone is operated at a temperature in the range of from about 400° C. to about 800° C., preferably from about 450° C. to about 750° C., and most preferably from 500° C. to 700° C.; a pressure in the range of from subatmospheric pressure to about 500 psia, preferably from about atmospheric to about 450 psia, and most preferably from 20 psia to 400 psia; and a weight hourly space velocity for the combination of the cracked gasoline, first diluent and second diluent in the range of from exceeding 0 hour$^{-1}$ to about 1000 hour$^{-1}$, preferably from about 0.25 hour$^{-1}$ to about 250 hour$^{-1}$, and most preferably from 0.5 hour$^{-1}$ to 100 hour$^{-1}$.

The reaction can take place in any reactor system known to those skilled in the art to be suitable for use in converting hydrocarbons to light olefins and aromatics in the presence of a zeolite catalyst. Typical reactor systems useful in the present invention include, but are not limited to, a fixed bed system, a moving bed system, a fluidized bed system and batch type operations.

In a further aspect of the invention, the mole ratio of the cracked gasoline to the combination of the first diluent and the second diluent is maintained substantially constant while providing increased first diluent conversion without a substantial change in selectivity of light olefins and BTX formation. The mole ratio of the cracked gasoline to the combination of the first diluent and the second diluent is more particularly in the range of from about 1:1 to about 1:6, preferably in the range of from about 1:2 to about 1:5, and most preferably from 1:3 to 1:4.

The following examples are provided to further illustrate this invention and are not to be considered as unduly limiting the scope of this invention.

EXAMPLE I

This example illustrates the preparation of catalysts which were subsequently tested as catalysts in the conversion of hydrocarbons to aromatics (BTX) and lower olefins (ethylene, propylene and butylenes).

Catalyst A

A commercially available ZSM-5 catalyst (provided by United Catalysts Inc., Louisville, Ky., under product designation "T-4480") was treated by acid leaching. To acid leach the catalyst, it was soaked in an aqueous HCl solution, having a concentration of 18 weight percent HCl (approximately 6N), for three hours at a constant temperature of about 85° C. After soaking, the catalyst was separated from the acid solution and thoroughly washed with water and dried. The acid soaked, washed and dried catalyst was calcined at a temperature of about 530° C. for three hours.

Three batches of catalyst A were prepared as follows.

A 6.0 gram quantity of the above-described calcined, acid-leached ZSM-5 catalyst was impregnated by an incipient wetness technique with a 7.4 gram quantity of a solution containing 1.4 grams of triethyl phosphate and 6.0 grams of hexane. This impregnated calcined, acid-leached zeolite was then dried in air at a temperature of about 120° C. for 3 hours followed by calcining at a temperature of about 530° C. for three hours. The final product contained about 4 weight percent phosphorous.

Two batches of catalyst A were prepared as follows.

A 10.0 gram quantity of the above-described calcined, acid-leached ZSM-5 catalyst was impregnated by an incipient wetness technique with a 10.3 gram quantity of a solution containing 2.3 grams of triethyl phosphate and 8.0 grams of hexane. This impregnated calcined, acid-leached zeolite was then dried in air at a temperature of about 120° C. for 3 hours followed by calcining at a temperature of about 540° C. for three hours. The final product contained about 4 weight percent phosphorus.

Catalyst B

A commercially available ZSM-5 catalyst (provided by United Catalysts Inc., Louisville, Ky., under product designation "T-4480") was treated by acid leaching. To acid leach the catalyst, it was soaked in an aqueous HCl solution, having a concentration of 18 weight percent HCl (approximately 6N), for three hours at a constant temperature of about 85° C. After soaking, the catalyst was separated from the acid solution and thoroughly washed with water and air dried overnight.

A 15.0 gram quantity of the above-described air dried, acid-leached ZSM-5 catalyst was impregnated by an incipient wetness technique with a 15.5 gram quantity of a solution containing 3.5 grams of triethyl phosphate and 12.0 grams of hexane. This impregnated air dried, acid-leached zeolite was then dried in air at a temperature of about 120° C. for 3 hours followed by calcining at a temperature of about 540° C. for 3 hours. The final product contained about 4 weight percent phosphorus.

EXAMPLE II

This example illustrates the use of the catalysts described in Example I as catalysts in the conversion of a hydrocarbon feed mixture comprising cracked gasoline and a propane diluent to benzene, toluene and xylenes (BTX) and lower olefins (ethylene, propylene).

A 4.4 g sample of catalyst A described in Example I was placed into a stainless steel tube reactor (length: about 18 inches; inner diameter: about 0.5 inch). Cracked gasoline from a catalytic cracking unit of a refinery and a propane diluent stream were passed through the reactor at flow rates of about 9.2 g/hour and about 13.2 g/hour, respectively, at a temperature of about 600° C. and at atmospheric pressure (about 0 psig). The formed reaction product exited the reactor tube and passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Test data results obtained after 4 hours on stream are summarized in Table I.

A 4.4 g sample of catalyst B described in Example I was placed into a stainless steel tube reactor (length: about 18 inches; inner diameter: about 0.5 inch). Cracked gasoline from a catalytic cracking unit of a refinery and a propane diluent stream were passed through the reactor at flow rates of about 9.2 g/hour and about 12.9 g/hour, respectively, at a temperature of about 600° C. and at atmospheric pressure (about 0 psig). The formed reaction product exited the reactor tube and passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Test data results obtained after 6 hours on stream are summarized in Table I.

EXAMPLE III

This example illustrates the use of the catalysts described in Example I as catalysts in the conversion of a hydrocarbon feed mixture comprising cracked gasoline and an iso-pentane diluent to benzene, toluene and xylenes (BTX) and lower olefins (ethylene, propylene).

A 4.4 g sample of catalyst A described in Example I was placed into a stainless steel tube reactor (length: about 18 inches; inner diameter: about 0.5 inch). Cracked gasoline from a catalytic cracking unit of a refinery and an iso-pentane diluent stream were passed through the reactor at flow rates of about 6.5 g/hour and about 19.8 g/hour, respectively, at a temperature of about 600° C. and at atmospheric pressure (about 0 psig). The formed reaction product exited the reactor tube and passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Test data results obtained after 3.5 hours on stream are summarized in Table II.

A 4.4 g sample of catalyst B described in Example I was placed into a stainless steel tube reactor (length: about 18 inches; inner diameter: about 0.5 inch). Cracked gasoline from a catalytic cracking unit of a refinery and an iso-pentane diluent stream were passed through the reactor at flow rates of about 6.5 g/hour and about 19.8 g/hour, respectively, at a temperature of about 600° C. and at atmospheric pressure (about 0 psig). The formed reaction product exited the reactor tube and passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Test data results obtained after 3.5 hours on stream are summarized in Table II.

EXAMPLE IV

This example illustrates the benefit of increased diluent conversion that results from introducing a second diluent in a process of contacting a hydrocarbon feed mixture comprising cracked gasoline and an iso-pentane diluent with catalyst A of Example I.

A 4.4 g sample of catalyst A described in Example I was placed into a stainless steel tube reactor (length: about 18 inches; inner diameter: about 0.5 inch). Cracked gasoline from a catalytic cracking unit of a refinery and an iso-pentane diluent stream were passed through the reactor at flow rates of about 9.0 g/hour and about 24.0 g/hour, respectively, at a temperature of about 600° C. and at atmospheric pressure (about 0 psig). The formed reaction product exited the reactor tube and passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Test data results obtained after 6 hours on stream are summarized in Table III.

A 4.4 g sample of catalyst A described in Example I was placed into a stainless steel tube reactor (length: about 18 inches; inner diameter: about 0.5 inch). Cracked gasoline from a catalytic cracking unit of a refinery, an iso-pentane diluent stream, and a second diluent stream comprising propane were passed through the reactor at flow rates of about 9.0 g/hour, about 17.0 g/hour and about 4.1 g/hour, respectively, at a temperature of about 600° C. and at atmospheric pressure (about 0 psig). The formed reaction product exited the reactor tube and passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Test data results obtained after 6 hours on stream are summarized in Table III.

A 4.4 g sample of catalyst A described in Example I was placed into a stainless steel tube reactor (length: about 18 inches; inner diameter: about 0.5 inch). Cracked gasoline from a catalytic cracking unit of a refinery, an iso-pentane diluent stream, and a second diluent stream comprising propane were passed through the reactor at flow rates of about 9.0 g/hour, about 10.2 g/hour and about 8.5 g/hour, respectively, at a temperature of about 600° C. and at atmospheric pressure (about 0 psig). The formed reaction product exited the reactor tube and passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Test data results obtained after 4 hours on stream are summarized in Table III.

A 4.4 g sample of catalyst A described in Example I was placed into a stainless steel tube reactor (length: about 18 inches; inner diameter: about 0.5 inch). Cracked gasoline from a catalytic cracking unit of a refinery, an iso-pentane diluent stream, and a second diluent stream comprising 1-hexene were passed through the reactor at flow rates of about 9.0 g/hour, about 20.3 g/hour and about 4.0 g/hour, respectively, at a temperature of about 600° C. and at atmospheric pressure (about 0 psig). The formed reaction product exited the reactor tube and passed through several ice-cooled traps. The liquid portion remained in these traps and was weighed, whereas the volume of the gaseous portion which exited the traps was measured in a "wet test meter". Liquid and gaseous product samples (collected at hourly intervals) were analyzed by means of a gas chromatograph. Test data results obtained after 6 hours on stream are summarized in Table III.

TABLE I

| Catalyst | BTX Yield | Light Olefin Yield* | Sum of BTX and Olefin | Propane Diluent Conversion (%) |
|---|---|---|---|---|
| A (T-4480 + AL + AD + C + 4% P) (invention) | 21.5 | 36.9 | 58.4 | 10.8 |
| B (T-4480 + AL + AD + 4% P) (control) | 19.3 | 36.5 | 55.8 | 5.9 |

TABLE II

| Catalyst | BTX Yield | Light Olefin Yield* | Sum of BTX and Olefin | Iso-pentane Diluent Conversion (%) |
|---|---|---|---|---|
| A (T-4480 + AL + AD + C + 4% P) (invention) | 12.3 | 40.3 | 52.6 | 48.0 |
| B (T-4480 + AL + AD + 4% P) (control) | 12.2 | 38.9 | 51.1 | 31.0 |

*ethylene and propylene

AL=Acid Leaching
AD=Air Drying
C=Calcining
P=Phosphorus

TABLE III

| Gasoline/Diluents Mole Ratio | Gasoline/Propane Diluent Mole Ratio | Gasoline/Iso-Pentane Diluent Mole Ratio | Gasoline/1-Hexene Diluent Mole Ratio | Light Olefin Yield * Wt. % | BTX Yield Wt. % | Iso-Pentane Diluent Conversion, Wt. % |
|---|---|---|---|---|---|---|
| 1:3.5 (Control) | — | 1:3.5 | — | 39.5 | 13.5 | 36.5 |
| 1:3.5 (Invention) | 1:1 | 1:2.5 | — | 42.8 | 14.8 | 44.8 |
| 1:3.5 (Invention) | 1:2 | 1:1.5 | — | 42.1 | 15.7 | 46.0 |
| 1:3.5 (Invention) | — | 1:3.0 | 1:0.5 | 40.0 | 13.7 | 42.0 |

* ethylene and propylene

The test data presented in Tables I and II show that use of the inventive catalyst results in considerably increased propane and iso-pentane diluent conversions, respectively, than control catalyst B. It is also noted that the yields of BTX and light olefins were higher with the use of the inventive catalyst than with control catalyst B.

The test data presented in Table III show that the total diluent conversion increased significantly with the introduction of a second diluent comprising either propane or 1-hexene. It is also noted that the yield of BTX and light olefins increased with the introduction of the second diluent. It is further noted that maintaining the mole ratio of the cracked gasoline to the combination of the first diluent and the second diluent substantially constant contributed to increased yields of BTX and light olefins and enhanced total diluent conversion.

Reasonable variations, modifications, and adaptations can be made within the scope of the disclosure and the appended claims without departing from the scope of this invention.

That which is claimed is:

1. A process for converting hydrocarbons comprising the steps of:
   a) introducing a hydrocarbon feed mixture comprising cracked gasoline and a first diluent comprising isopen tane to a reaction zone, said reaction zone contains a catalyst composition comprising a zeolite and a phosphorus component and is operated under reaction conditions for converting hydrocarbons to light olefins;

b) withdrawing from said reaction zone a reactor effluent comprising light olefins and BTX; and c) controllably introducing a second diluent comprising propane into said reaction zone in an amount such that the mole ratio of said diluent to said first diluent is in the range of from about 1:0.1 to about 1:10, whereby the percent conversion of said first diluent is enhanced over the percent conversion of said first diluent when there is no step c.

2. A process according to claim 1 whereby the percent conversion of said first diluent is higher than the percent conversion of said first diluent when there is no step c.

3. A process according to claim 1 whereby the percent conversion of said first diluent is in the range of from about 40 weight % to about 90 weight %.

4. A process according to claim 1 further including the step of maintaining the mole ratio of said cracked gasoline to the combination of said first diluent and said second diluent in the range of from about 1:1 to about 1:6.

5. A process according to claim 1 further including the step of maintaining the mole ratio of said cracked gasoline to the combination of said first diluent and said second diluent in the range of from about 1:2 to about 1:5.

6. A process according to claim 1 further including the step of maintaining the mole ratio of said cracked gasoline to the combination of said first diluent and said second diluent in the range of from 1:3 to 1:4.

7. A process according to claim 1 wherein said reaction zone is operated at a temperature in the range of from about 400° C. to about 800° C., a pressure in the range of from subatmospheric to about 500 psia and a weight hourly space velocity for the combination of said cracked gasoline, said first diluent and said second diluent in the range of from exceeding 0 $hour^{-1}$ to about 1000 $hour^{-1}$.

8. A process according to claim 1 wherein said zeolite is a calcined, acid-leached zeolite.

9. A process according to claim 1 wherein said catalyst composition is produced by:

acid leaching a zeolite to form an acid-leached zeolite.

calcining said acid-leached zeolite to form a calcined, acid-leached zeolite; and incorporating a phosphorus component into said calcined, acid-leached zeolite to provide said catalyst composition.

10. A process according to claim 1 wherein said zeolite is ZSM-5.

11. A process according to claim 1 wherein the acid leaching of said zeolite includes contacting said zeolite with a hydrochloric acid solution for a time period in the range of from about 0.1 hour to about 15 hours.

12. A process according to claim 1 wherein the calcining of said acid-leached zeolite includes heating said acid-leached zeolite at a temperature in the range of from about 250° C. to about 1000° C. at a pressure in the range of from about atmospheric to about 1000 psia and for a time period in the range of from about 0.1 hour to about 30 hours.

13. A process according to claim 1 wherein said catalyst composition comprises in the range of from about 1 to about 10 weight % phosphorus based on the total weight of said catalyst composition.

14. A process according to claim 1 wherein said catalyst composition comprises about 1 to about 8 weight % phosphorous based on the total weight of said catalyst composition.

15. A process according to claim 1 wherein said catalyst composition comprises about 3 to about 6 weight % phosphorous based on the total weight of said catalyst composition.

16. A process according to claim 1 wherein said catalyst composition comprises about 1 to about 99 weight % zeolite based on the total weight of said catalyst composition.

17. A process according to claim 1 wherein said catalyst composition comprises about 5 to about 80 weight % zeolite based on the total weight of said catalyst composition.

18. A process according to claim 1 wherein said catalyst composition comprises from 10 to 70 weight % zeolite based on the total weight of said catalyst composition.

19. A process according to claim 1 wherein said phosphorus component is incorporated into said calcined, acid-leached zeolite by contacting said calcined, acid-leached zeolite with a solution comprising hexane and triethyl phosphate and calcining the resulting mixture.

20. A process for converting hydrocarbons comprising the steps of:

a) introducing a hydrocarbon feed mixture comprising cracked gasoline and a first diluent comprising isopentane to a reaction zone, said reaction zone contains a catalyst comprising a zeolite and a phosphorus component and is operated under reaction conditions for converting hydrocarbons to light olefins;

b) withdrawing from said reaction zone a reactor effluent comprising light olefins; and c) controllably introducing a second diluent comprising 1-hexene into said reaction zone in an amount such that the mole ratio of said second diluent to said first diluent is in the range of from about 1:0.1 to about 1:10, whereby the percent conversion of said first diluent is enhanced over the percent conversion of said first diluent when there is no step c.

21. A process according to claim 20 whereby the percent conversion of said first diluent is higher than the percent conversion of said first diluent when there is no step c.

22. A process according to claim 20 whereby the percent conversion of said first diluent is in the range of from about 39 weight % to about 90 weight %.

23. A process according to claim 20 further including the step of maintaining the mole ratio of said cracked gasoline to the combination of said first diluent and said second diluent in the range of from about 1:1 to about 1:6.

24. A process according to claim 20 further including the step of maintaining the mole ratio of said cracked gasoline to the combination of said first diluent and said second diluent in the range of from about 1:2 to about 1:5.

25. A process according to claim 20 further including the step of maintaining the mole ratio of said cracked gasoline to the combination of said first diluent and said second diluent in the range of from 1:3 to 1:4.

26. A process as recited in claim 20 wherein said reaction zone is operated at a temperature in the range of from about 400° C. to about 800° C., a pressure in the range of from subatmospheric to about 500 psia and a weight hourly space velocity for the combination of said cracked gasoline, said first diluent and said second diluent in the range of from exceeding 0 $hour^{-1}$ to about 1000 $hour^{-1}$.

27. A process according to claim 20 wherein said zeolite is a calcined, acid-leached zeolite.

28. A process according to claim 20 wherein said catalyst composition is produced by:

acid leaching a zeolite to form an acid-leached zeolite;

calcining said acid-leached zeolite to form a calcined acid-leached zeolite; and incorporating a phosphorus component into said calcined, acid-leached zeolite to provide said catalyst composition.

29. A process according to claim 20 wherein said zeolite is ZSM-5.

30. A process according to claim 20 wherein the acid leaching of said zeolite includes contacting said zeolite with a hydrochloric acid solution for a time period in the range of from about 0.1 hour to about 15 hours.

31. A process according to claim 20 wherein the calcining of said acid-leached zeolite includes heating said acid-leached zeolite at a temperature in the range of from about 250° C. to about 1000° C. at a pressure in the range of from about atmospheric to about 1000 psia and for a time period in the range of from about 0.1 hour to about 30 hours.

32. A process according to claim 20 wherein said catalyst composition comprises in the range of from about 1 to about 10 weight % phosphorus based on the total weight of said catalyst composition.

33. A process according to claim 20 wherein said catalyst composition comprises about 1 to about 8 weight % phosphorus based on the total weight of said catalyst composition.

34. A process according to claim 20 wherein said catalyst composition comprises about 3 to about 6 weight % phosphorus based on the total weight of said catalyst composition.

35. A process according to claim 20 wherein said catalyst composition comprises about 1 to about 99 weight % zeolite based on the total weight of said catalyst composition.

36. A process according to claim 20 wherein said catalyst composition comprises about 5 to about 80 weight % zeolite based on the total weight of said catalyst composition.

37. A process according to claim 20 wherein said catalyst composition comprises from 10 to 70 weight % zeolite based on the total weight of said catalyst composition.

38. A process according to claim 20 wherein said phosphorus component is incorporated into said calcined, acid-leached zeolite by contacting said calcined, acid-leached zeolite with a solution comprising hexane and triethyl phosphate and calcining the resulting mixture.

* * * * *